United States Patent
Flockhart et al.

(10) Patent No.: US 8,634,543 B2
(45) Date of Patent: Jan. 21, 2014

(54) ONE-TO-ONE MATCHING IN A CONTACT CENTER

(75) Inventors: Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 104 days.

(21) Appl. No.: 12/882,950

(22) Filed: Sep. 15, 2010

(65) Prior Publication Data

US 2011/0255683 A1    Oct. 20, 2011

Related U.S. Application Data

(60) Provisional application No. 61/324,216, filed on Apr. 14, 2010.

(51) Int. Cl.
*H04M 3/00* (2006.01)

(52) U.S. Cl.
USPC ............. 379/266.01; 379/265.01; 379/266.02

(58) Field of Classification Search
USPC ................................................... 379/266.01
See application file for complete search history.

(56) References Cited

U.S. PATENT DOCUMENTS

| | | | |
|---|---|---|---|
| 5,953,406 A | 9/1999 | LaRue et al. | |
| 6,272,544 B1 | 8/2001 | Mullen | |
| 6,493,695 B1 | 12/2002 | Pickering et al. | |
| 6,603,854 B1 | 8/2003 | Judkins et al. | |
| 7,325,190 B1 | 1/2008 | Boehmer et al. | |
| 7,382,773 B2 * | 6/2008 | Schoeneberger et al. | 370/353 |
| 7,689,630 B1 | 3/2010 | Lam | |
| 7,894,595 B1 * | 2/2011 | Wu et al. | 379/265.11 |
| 8,335,704 B2 | 12/2012 | Trefler et al. | |
| 2005/0049999 A1 | 3/2005 | Birn et al. | |
| 2005/0114164 A1 | 5/2005 | Lyons | |
| 2006/0015388 A1 | 1/2006 | Flockhart et al. | |
| 2006/0093124 A1 | 5/2006 | Inamdar | |
| 2006/0112004 A1 | 5/2006 | Kim | |
| 2006/0136490 A1 | 6/2006 | Aggarwal et al. | |
| 2006/0270413 A1 | 11/2006 | Matteo et al. | |
| 2007/0016907 A1 | 1/2007 | Benedetti et al. | |
| 2008/0260122 A1 * | 10/2008 | Conway et al. | 379/112.01 |

(Continued)

FOREIGN PATENT DOCUMENTS

| | | |
|---|---|---|
| EP | 1107559 | 6/2001 |
| EP | 1209887 | 5/2002 |
| WO | WO 2006/067026 | 6/2006 |
| WO | WO 2006/124113 | 11/2006 |

OTHER PUBLICATIONS

Search Report for United Kingdom Patent Application No. GB1106316.1, dated Aug. 11, 2011 3 pages.

(Continued)

*Primary Examiner* — Curtis Kuntz
*Assistant Examiner* — Thomas Maung
(74) *Attorney, Agent, or Firm* — Sheridan Ross P.C.

(57) ABSTRACT

A queueless contact center is described along with various methods and mechanisms for administering the same. The contact center proposed herein provides the ability to, among other things, achieve true one-to-one matching. Solutions are also provided for managing data structures utilized by the queueless contact center. Furthermore, mechanisms for generating traditional queue-based performance views and metrics for the queueless contact center are proposed to help facilitate a smooth transition from traditional queue-based contact centers to the next generation contact centers described herein.

17 Claims, 12 Drawing Sheets

(56) References Cited

U.S. PATENT DOCUMENTS

| | | |
|---|---|---|
| 2009/0049443 A1 | 2/2009 | Powers et al. |
| 2009/0190744 A1 | 7/2009 | Xie et al. |
| 2009/0190745 A1 | 7/2009 | Xie et al. |
| 2010/0014511 A1* | 1/2010 | Ezerzer et al. ............... 370/352 |
| 2010/0138270 A1* | 6/2010 | Werth et al. ...................... 705/9 |
| 2010/0226490 A1* | 9/2010 | Schultz et al. ........... 379/265.09 |
| 2010/0266116 A1* | 10/2010 | Stolyar et al. ............ 379/266.01 |
| 2011/0044320 A1 | 2/2011 | Flockhart et al. |
| 2011/0255681 A1 | 10/2011 | Flockhart et al. |
| 2011/0255682 A1 | 10/2011 | Flockhart et al. |
| 2011/0255684 A1 | 10/2011 | Flockhart et al. |
| 2011/0255685 A1 | 10/2011 | Flockhart et al. |

OTHER PUBLICATIONS

Search Report for United Kingdom Patent Application No. GB1106323.7, dated Aug. 12, 2011 4 pages.

Search Report for United Kingdom Patent Application No. GB1106317.9, dated Aug. 15, 2011 3 pages.

Search Report for United Kingdom Patent Application No. GB1106322.9, dated Aug. 15, 2011 3 pages.

Search Report for United Kingdom Patent Application No. GB1106327.8, dated Aug. 16, 2011 3 pages.

Official Action for U.S. Appl. No. 12/882,977, mailed Nov. 7, 2012 23 pages.

Official Action for U.S. Appl. No. 12/882,955, mailed Nov. 30, 2012 20 pages.

Official Action for U.S. Appl. No. 12/882,970, mailed Dec. 6, 2012 17 pages.

Official Action for U.S. Appl. No. 12/882,986, mailed Feb. 15, 2013 9 pages.

Final Action for U.S. Appl. No. 12/882,955, mailed May 21, 2013 24 pages.

Final Action for U.S. Appl. No. 12/882,970, mailed May 23, 2013 14 pages.

Final Action for U.S. Appl. No. 12/882,977, mailed Apr. 25, 2013 24 pages.

* cited by examiner

ONE-TO-ONE MATCHING IN A CONTACT CENTER

CROSS-REFERENCE TO RELATED APPLICATIONS

This application claims the benefit of U.S. Provisional Application No. 61/324,216, filed Apr. 14, 2010, the entire disclosure of which is hereby incorporated herein by reference.

FIELD OF THE DISCLOSURE

The present disclosure is generally directed toward communications and more specifically toward contact centers.

BACKGROUND

The traditional notion in contact centers was that queues were required to achieve efficiencies in work distribution while also minimizing agent idle time. Unfortunately, the utilization of queues almost always results in suboptimal routing. That is an agent is often not assigned to the work item which she is most qualified to handle and vice versa.

For example, in skill-based queues a work item queue is paired with a corresponding resource queue. When work items are received at the Automated Contact Distributor (ACD), the attributes of the work item are analyzed and then the work item is placed in a specific queue based on its attributes. Similarly, when a contact center resource (often an agent) comes on line they are assigned to one or more resource queues that also have a corresponding skillset associated therewith. Since skill queues are provided in work item/resource pairs, the next available agent in a resource queue is assigned the next work item waiting in the work item queue. While there have been some solutions to make this queue and assignment structure more flexible, every solution has always been hampered by the notion of utilizing a number of queues.

In order to improve efficiency, a contact center will typically segment contacts into many different queues. This segmentation may be by service, language, media type, region, and/or customer type. This can quickly result in many thousands of queues. Each of these queues needs to be configured, managed, monitored and reported on. Also, as agents gain new skills and improve their expertise levels, there is a need to constantly reassign agents to queues. Furthermore, when an agent gains new skills there is a significant cost in administration and operational costs of the contact center. Complexity increases because agents are typically in multiple queues simultaneously, and the new skills of an agent need to be updated in all relevant queues. Updating these changes in agent skills is a time-consuming and expensive task, which usually has to be performed with some amount of manual oversight. All of these factors add significant complexity and cost to the running of the center.

Despite this, contact centers still see the need to improve efficiency and to segment work even further. This could be by revenue, age group, gender, accent or a host of other possibilities. However, contact centers are constrained from realizing these additional efficiency gains because of the sheer impracticality of managing tens of thousands of queues. The current method of improving efficiency by segmentation has reached its limits and a new mechanism is required in order to attain improved levels of efficiency.

SUMMARY

It is with respect to the above issues and other problems that the embodiments presented herein were contemplated. This disclosure proposes a solution to the traditional queue-based contact centers.

One aspect of the present disclosure proposes a queueless contact center. One-to-one optimal matching of work items and agents can be achieved by discarding the notion that queues are required in a contact center. Instead of pre-organizing work items and resources into specific buckets or queues, the present disclosure proposes a system where ultra-fast mapping can be performed. Such ultra-fast mapping may be realized by first performing a qualification determination (i.e., determine which objects are qualified to be assigned to the newly available object), an eligibility determination (i.e., determine which of the qualified objects are eligible to be assigned to the newly available object), and a suitability determination (i.e., determine which of the eligible objects are most suitable for being assigned to the newly available object).

One general algorithm which may be utilized to achieve the above-noted goals in a contact center environment includes:

(1) Create 3 "pools" (unordered collections), one for all resources in a contact center, one for all work items in the contact center, one for all qualifier sets in the contact center.

(2) For each pool, create a qualification bit map. 1 bit for each entry is provided in the qualification bitmap. This bitmap can be used to speed up complex scans of pools, especially during the qualification determination and even during the eligibility determination.

When a work item is added to the contact center, the following can be performed:

(1) receive a work item;

(2) determine attributes of the work item that will be used for qualification, for example language=English, intent=Sales. The specific combination of required attributes is defined as a "qualifier set" and the number of attributes within a qualifier set can vary from one attribute to many attributes. Moreover, attributes may be regarded as a characteristic or multiple characteristics of an object, such as a piece of work or a resource in a contact center.

(3) place an entry for the qualifier set into a qualifier set pool if it is not there, where the "Qualifier set Pool" contains all qualifier sets used so far in the contact center. The work item will then save the index of this qualifier set in the qualifier set pool.

(4) The work item is placed in the "Work Item Pool".

When a resource is added, the following can be performed:

(1) determine attributes of the resource that are used for qualification (these will be the same attributes used for the work items above). This may be performed for all the attribute combinations for the resource since resources have multiple "qualifier sets".

(2) place an entry for the qualifier set into a qualifier set pool if it is not there and get its index. The resource will then save the index to that qualifier set. It should be noted that if the resource qualifier set index is the same as the work item qualifier set, then the work item is qualified If a qualified work item is also currently available to receive the newly received resource, then that work item is considered eligible.

(3) One or more entries for a resource are placed in the "Resource Pool".

When a resource becomes available (work item surplus state), the following can be performed:

(1) compute the qualifier set qualification bitmap, setting a 1 for each qualifier set the resource is qualified for.

(2) scan the work item pool for works with the qualifier set index is a 1 in the qualifier set qualification bitmap.

(3) on a "qualified" work item, determine eligibility, and then score all eligible work items based on the current work selection strategy for this resource. Exemplary types of work selection strategies which may be employed include, without limitation, optimize agent utilization, minimize cost, simultaneously minimize cost and minimize work item wait time, and so forth.

(4) if this eligible work item scores "better" than all previously analyzed eligible work items, then it's the new best work item.

(5) after ALL the eligible work items are "considered", the best is selected as the optimal work item.

(6) assign the optimal work item to the resource.

(7) route the optimal work item to the resource.

When a work item becomes available (resource surplus state), the following can be performed:

(1) execute the "qualification" policies to determine what attributes will be used for qualification. For example, after some period of time, language requested may be ignored, so the resource considerations would be expanded.

(2) compute qualifier set bitmap for the available work item using its qualifications.

(3) scan the resource pool for resource entries where the qualifier set index is a 1 in the qualifier set qualification bitmap to determine qualified resources.

(4) on a qualified resource, determine eligibility, and then score the resource, if eligible, using the work item's resource selection strategy. If the eligible resource scores better than all previously analyzed resources, then it's the new best resource.

(5) after scanning ALL resources, the best is selected as the optimal resource.

(6) assign the work to the optimal resource.

(7) route the work item to the optimal resource.

The above description is but one possible logical implementation. The bitmaps on the work and resource pool were not used. Those maps can be used to provide improved performance by "compressing" the eligibility rules into a single bit when the resource or work changes state. For example, if a resource is logged-in and idle, then it may be considered eligible and its bit is set to reflect the same. The bit table is checked during the qualification and eligibility determination steps before scoring to "filter" out those resources that should not be scored. The same mechanism can be applied to work items to minimize processing time.

There are a number of variations that are within the scope of the present disclosure. For instance, certain attributes of a work item or resource may be time or state dependant. For example, as an agent continues to develop proficiencies in handling certain work item-types, that agent's attributes may alter accordingly. Likewise, as a work item continues to wait for a resource, that work item's attributes may alter accordingly, thereby making it eligible and better suited for assignment to a resource than other work items. Note that while the attributes of these elements may change, they never have to be moved into or out of a queue. Rather, their attributes may change over time which may result in a different mapping as time progresses.

In some embodiments, such dynamic attributes may be analyzed during the eligibility determination rather than during the qualification determination. This ensures that only the minimal number of objects are considered during the eligibility determination as this may require some processing to compute the eligibility bitmap, which likely varies over time more frequently than bits represented in the qualification bitmap which do not tend to vary as frequently. As can be appreciated, however, bits used for qualification and eligibility may be maintained in a single bitmap if desired, but only certain bits within that map may be analyzed during the qualification or eligibility determinations.

Another aspect of the present disclosure is to add a second layer of rules to a resource's attribute table which may cause one of the bits for one of their attributes to change if that resource has handled their daily quota of a certain work item-type. Other rules for flipping bit values can be utilized for work items, resources, and/or qualifier sets. Flipping a bit in the resource's bitmap would thereby make the resource ineligible to handle their best work item-type for the rest of the day (or some other predefined period), even though that resource is a qualified resource.

Further details related to the structure of the bitmap are also described herein. The exemplary bitmaps described herein enable a massive performance scale. In particular, utilization of the bitmaps as described herein has been proven to work for 100,000 agents all working off of a single server that is looking at over 1,000,000 work items. Without the specific bitmaps contemplated it would be difficult to achieve a queueless contact center on a large scale. However, a queueless contact center (achieving a one-to-one mapping) could likely be implemented on a smaller scale without the bitmaps being proposed herein.

Among the other advantages which can be achieved by the present disclosure include: no queues or link lists; no pre-ordering of work items or resources; consideration of every item in the contact center for assignment whenever an opposite element becomes available; one-to-one matching; and no constraints on matching rules.

It is another aspect of the present disclosure provides data structures which make it possible to achieve high-performance one-to-one matching in a large scale contact center or other environments where a large number of objects are considered during matching determinations.

The basic data structure is a "pool" and an associated bitmap. Each bit in the bitmap corresponds to a single entry in the pool. There can be three structures defined, one for all resources in the contact center, one for all work items in the contact center, and one for all qualifier sets in the contact center (where a qualifier set is a combination of qualification attributes, like language=english, intent=sales, customerType=gold). Work assignment determinations can be accomplished by scanning these tables and evaluating different kinds of rules. Qualifier sets are used instead of the traditional skillsets of the prior art. Prior art contact centers were concerned with skillsets which define skills of a resource or work item and are used to assign resources and work items to queues. In other words, the utilization of skillsets implies the need for queues. Embodiments of the present disclosure utilize qualifier sets since queues are no longer needed to make assignment decisions and every available work item or resource is considered for every assignment decision.

The first kind of rules are qualification rules. Qualification rules select what can be "considered" in a match by looking at the attributes.

The second kind of rules are eligibility rules. Eligibility rules determine which among qualified objects are currently allowed to be assigned to another object. For instance, normally a resource must be logged in to be considered eligible to receive a work item. Thus, more dynamic attributes (e.g., time dependent attributes, contact center state-based attributes, object state-based attributes, etc.) may be considered in the eligibility rules whereas more static attributes are considered in the qualification rules.

The third kind of rules are scoring rules. Scoring determines which consideration (potential and eligible match) is better than other eligible matches. For example, a longer time waiting (for First-in-First-out (FIFO) behavior) would score better and thus that consideration would become the "best" match. After scanning all the possible considerations, the best is then assigned to a resource. Note that in a "brute force" method, only need two pools are needed, work item and resources. When a work item is added to the system, a scan is made of all resources, when a resource becomes ready for work, a scan is made of all work items.

The size of the pools may limit the number of considerations that can be made, practical limits on Central Processing Unit (CPU) time, allow the above method to work for only small pools. In order to achieve an enterprise-scale implementation, sizes (100K and larger), embodiments of the present disclosure incorporate the second element of the data structures, the qualification bit maps. Each pool has a qualification bitmap. The bitmap stores compressed rule evaluations, allowing an increase of nearly two orders of magnitude in pool size and the number of considerations. Adding the third structure, the Qualifier set Pool, provides a common mapping ground for resources looking for work and work looking for resources and provides a level of indirection that is independent of the size of the Resource/Work item pools since the total number of qualifier sets is much less than the pool sizes for Resources and Work. Because of this, an "amplification" in performance by the ratio of the table sizes can be realized. For example, if a system has 256K work items to consider, and 32K qualifier sets possible, then an 8× performance improvement can be achieved by using the qualifier set pool in the match. This is further improved by using cache-conscious techniques that allow the 32K qualifier sets to be compressed to 4K bytes of bits by applying the qualification rules in a separate step. For example, this means that instead of executing 5 qualification rules per each of the considerations (250K*5=2.5M rules evaluations), only execute (32K*5=162K rules). If the number of considerations goes to 1M, embodiments of the present disclosure still do only 162k rules, the bigger the number of objects considered during matching, the more efficient this solution is.

This rule time is constant and can be pipelined for even better performance. The small bitmap also increases performance by being continuous in memory and it may be evaluated, for example, at up to 64 bits or more at a time, increasing the processing time another order of magnitude by eliminating CPU cache stalls that can cost delay process as much as 100 floating point operations. In some embodiments, a GPU or FPGA may be utilized, thereby further decreasing processing time.

The use of bitmaps for qualifications exploits the fact that for any match, most considerations are not valid. This means the bitmap is mostly zero's and this fact can be leveraged to "scan" it fast.

In some embodiments, an Enterprise Qualifier Set Pool is specifically organized to represent different qualification attribute combinations. Each combination of attributes in the pool represents a possible attribute combination that a work item might have and that would be relevant to making a work assignment decision. In other words, not every single attribute for a work item may be represented in the attribute table. Examples of such important attributes include, without limitation, language, region (physical location), customer type (e.g., platinum level, gold level, silver level, or unassigned), contact type (e.g., realtime call, realtime chat, email, fax, RSS feed, blog posting, etc.), whether the contact is related to a specific intent, product or service (e.g., for Comcast Broadband Services whether the contact is related to digital voice services, cable television services, or broadband Internet services), and so on. Each possible combination of attributes are represented in the attribute table and have a corresponding combination ID defined as the "qualifier set ID". The qualifier set ID corresponds to an entry within the qualifier set Pool (specifically the index) where the specific attribute combination is located. For each work item and each qualifier set ID a corresponding '1' or '0' is calculated, where '1' represents the fact that the combination evaluates true for the work item (e.g., the work item has processing needs consistent with the evaluated combination) and '0' represents the fact that the combination evaluates negative for the work item (e.g., the work item does not have the processing needs consistent with the evaluated combination). It is likely that most qualifier set IDs for a given work item have a corresponding '0' as most work items have relatively specific processing needs and attributes. The evaluation values ('1s' and '0s') along with the corresponding qualifier set ID are stored in a compressed qualifier set bitmap.

Similar to the work item pool, and the pool of resources also have their own qualification bitmap. The resource pool and qualification bitmap are constructed similarly to the work item pool and qualification bitmap. The qualifier set IDs of the resource may match the qualifier set IDs of the work item such that if an evaluation is performed for a specific attribute combination and the evaluation results in a value of '1' for both the work item and the resource, then that resource is qualified to process the work item.

The work and resource bitmaps can be modified when the associated object (resource or work) changes state. This happens infrequently, and is usually the result of time events, more data being added or the "state" is modified. The associated qualification bit is computed by rules that execute on the change and eliminate the execution of those rules during the scan. This allows for a tremendous reduction in rule evaluation and further reduces the number of rules that execute "per consideration". These bitmaps are evaluated during the scan, to "skip" over large numbers of entries in the pool being considered.

The work assignment determination process can be performed in a three-step fashion. First, the '1s' and '0s' of the bitmaps (for resources or work items) are checked to determine which resources are qualified to receive a work item or vice versa. Advantageously, the bitmap is primarily constituted of '0s' which means that most resources will be eliminated as qualified, thereby reducing the number of resources that have to be analyzed in the following steps.

Second, those objects which are determined to be qualified may then be further examined for eligibility. During the eligibility determination, more dynamic attributes of the qualified object may be analyzed. In particular, eligibility bitmaps (or bit values of eligibility attributes within the qualification bitmap) may be computed and then examined to determine if any of the qualified objects are not currently eligible to be assigned to the newly available object. Ineligible objects are discarded and will not be further analyzed in the third step. In this step, the qualifier set IDs may be compared to identify eligible resources for a work item or vice versa.

Finally, a scoring operation is employed to determine if the current consideration is the best. After completion of the scan and consideration of all eligible objects, the "best" object is assigned. Each step reduces the number of considerations in subsequent steps and can be pipelined for even better efficiency.

Further details of this entire scanning process as it relates to the use of bitmaps is described in U.S. patent application Ser. No. 12/545,413 to Flockhart and Steiner, the entire contents of which are hereby incorporated herein by reference.

Although the pools and bitmaps are depicted and described as flat tables, the present disclosure is not so limited. Rather, hierarchical tables, pivot tables, or any other data structure or set of data structures can be used without departing from the scope of the present disclosure.

Another aspect of the present disclosure provides a description of processing schemes which can be used in a queueless contact center to obtain high performance efficiencies.

First, the proposed queueless contact center involves performing bitmap operations on the work item bitmap, the resource bitmap and the qualifier set bitmap. One purpose of the bitmap operations is to store the pre-computed result of one or more qualification rules. In resource surplus, a work item uses the qualifier set bitmap to select qualified resources and uses the resource bitmap to select the ones that are really eligible. In a work surplus situation, the resource uses the qualifier set bitmap to select qualified work. Optionally, it can use the work item bitmap to test the work to see if it can be processed (eligible to process). For simple work assignment utilization of the work item bitmap may not be necessary.

Advantageously, the bitmaps have mostly '0' values (e.g., most bitmaps will have 95% or more '0' values meaning that less than 5% of all resources are qualified for a particular work item, or vice versa). This is due to the fact that most work items only satisfy a single combination of qualification or eligibility requirements and most resources have specialized skills. That is, most resources do not have the ability or permission to handle every single work item that enters a contact center. Because only bit comparisons are performed, eligible work item/resource matches can be identified very quickly, even when considering all work items in a contact center for a particular resource and vice versa. Each bit in the bitmaps represents multiple rule evaluations.

This means that the organization of the bitmaps and the computation of the bits contained within the bitmaps is important. Because a bit comparison is performed, the types of attributes considered in generating the bits which populate the bitmaps also becomes important. Business rules and performance goals can be considered when determining which attributes will be considered in the attribute combination. Generally speaking, every possible attribute will not be included in the attribute combinations which are used to make work assignment decisions. Because the present disclosure proposes qualification mapping as an alternative to skill-based queues, the attributes which historically corresponded to a specific queue or skill within a contact center may be included as an attribute in the attribute combination, although this is not a requirement. Other business rules can also be included as metrics in calculating a bitmap or they may be used as an active filter which modifies a certain bit value (e.g., from '1' to '0') in the bitmap if certain criteria are met (or not met).

Another scheme which is proposed is a fast skip or bulk evaluation scheme. Performance efficiencies can be achieved during the bit comparison by looking one or multiple bitmaps in chunks rather than on a bit-by-bit basis. As noted above, most values in the bitmaps will have a value of '0'. The bulk evaluation scheme allows the comparison engine to review multiple bits (e.g., 64 bits or more) simultaneously to determine if that chunk of bits has a '1' value therein. If the chunk of bits does not have a '1' value therein, then the comparison engine can quickly move on to the next chunk without performing any further analysis. Of course, if the chunk is identified as having a '1' value then a bit-by-bit comparison or evaluation may be required for that chunk. There are a number of ways to perform a fast skip as described above. For example, Boolean expressions, such as an OR function, can be used to represent the value of a chunk. If the Boolean expression for a chunk results in a value of '0', then each bit within the entire chunk can be said to have a '0' without any further analysis.

Yet another aspect of the present disclosure provides mechanisms for populating and maintaining the data structures within a queueless contact center. In particular, because the organization of the bitmaps of the present disclosure is so important, the population and management thereof also become important. However, because so many pools and pool entries are utilized, population and management by hand is difficult if not impossible.

The present disclosure provides a Contact Center Algorithm Language (CCAL) that can populate, organize, and manage the pools and bitmaps used in a queueless contact center. CCAL is a domain-specific language that is capable of writing the rules which populate the pools with work item, resource or qualifier set attributes. Moreover, CCAL organizes the attributes within the pools by determining the order in which attributes are included in the pool and the manner in which bitmaps are calculated. In particular, CCAL can take a business rule (e.g., maximize profit, minimize idle agents, minimize wait time, etc.) and determine which attributes contribute to the business rule. Often times multiple business rules are considered by CCAL and an attribute may contribute to both of the business rules in some fashion. CCAL considers the pertinent goals/business rules defined by an administrator of the contact center and then identifies which attributes will be included in the work item and resource attribute pools in determining an attribute combination. Some attributes that are inputs to a business rule or contact center goal may be excluded from the attribute pool if it is determined that other more important attributes are needed for consideration. CCAL also identifies the order in which the attributes will appear in the pool and places the necessary attributes in the optimal location of the pool. The output of CCAL is an optimized Work Assignment Engine—it generates the code and the program. The program may be provided as a computing application and may be in a traditional computing language, machine code, byte code, GPU-specific code, or object code (for CPU or virtual machine). It should be appreciated that the present disclosure is not limited to any specific type of output.

As business goals or contact center states change, CCAL may be enabled to re-consider which attributes are included in the various contact center pools and bitmaps. If a new attribute is to be added, CCAL may either identify an attribute to remove from the pools and/or determine an optimal new order of attributes within the pools. This is accomplished by first looking at all the mathematical expressions used in all the rule sets define a given contact-centers operation. The data dependencies are then analyzed, first by references then by order of execution. Once the detailed execution of the rules are understood, a set of optimization rules are executed to transform the rule sets into data structures, procedures, tasks, and events. This optimization is stored in a implementation neutral storage Abstract Syntax Tree called 'Z'. Z can be translated into Java, C++, C# or directly into machine code.

One issue with implementing a queueless contact center as proposed herein is that most customers have mechanisms in place for monitoring and managing the operation of a traditional queue-based contact center. Another aspect of the present disclosure provides mechanisms which generate views and metrics for a queueless contact center that are similar to views and metrics for traditional queue-based contact centers. This allows the customer (i.e., contact center administrator) to have a certain comfort level in purchasing the new contact center equipment, plus the customer does not have to significantly modify their current management structure to accommodate the new contact center architecture. The traditional complexity of multi-queue work requires significant calculations when preparing performance reports. Such complexities are eliminated by the present disclosure which eliminates the notion and need of a queue-based architecture. Thus, preparation of views and metrics of the contact center is also greatly simplified by eliminating the queue-based architecture of the prior art.

In some embodiments, the views and metrics are generated as follows: each entity in a pool (i.e., a qualifier set for the qualifier set pool, a work item for the work item pool, and a resource for the resource pool) has a set of metrics associated therewith. For example, a work item may have metrics related to how long it has been waiting for service as well as its attributes defining the processing needs of the work item. While only some of those attributes may be included in the work item's "qualifier set" (i.e., specific set of routing qualification attributes), more or less of the attributes may be used to compute a view for that work item. A view is a combination or composite of the work item's attributes. The same process can be performed when calculating a view or metric for a qualifier set or resource.

The metrics and view for the work item can be calculated as often as is desired (i.e., continuously or periodically). Additionally, metrics and views can be calculated for a subset of entities in a pool (e.g., all resources having a certain common attribute or common set of attributes) or metrics and views can be calculated for the entire pool, if desired. Furthermore, CCAL is a domain-specific language that provides a simple mechanism for describing rules, metrics, views, and how to compute and combine the same with business-based strategies.

The metrics and views generated for an entity or a set of entities may be generated in such a manner as to emulate traditional metric and views generated in a skill-based contact center. For example, an Estimated Wait Time (EWT) may be generated for a qualifier set. As another example, average processing time for all the work items in a qualifier set may also be calculated. These examples are not intended to be limiting. Any type of view or metric traditionally generated in a queue-based contact center may be generated in the proposed queueless contact center. This model can be extended further to organize the qualifier sets, resources or work items into groups and the metrics can be further processed into new "rolled-up" views. These views may be used by reporting, or by the Work Assignment Engine itself For example, health measurements may be computed on a group of entities and when a threshold is reached, different algorithms may be invoked to correct the situation. Exemplary outputs of views and metrics which may be provided for the queueless contact center are further described in U.S. patent application Ser. No. 11/517646, filed Sep. 7, 2006, the entire contents of which are hereby incorporated herein by reference.

Although embodiments of the present disclosure are discussed in connection with a communication application environment, the object-matching algorithms proposed herein may be utilized to increase object matching in many other environments. For example, embodiments of the present disclosure may be utilized in financial portfolio optimization problems (e.g., matching available financial resources with financial investment opportunities), route optimization problems (e.g., matching possible routes between current and desired locations or optimizing delivery routes for parcel carriers), matching projects and bids, or any other application where there is limited supply or limited demand for some resource or service.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
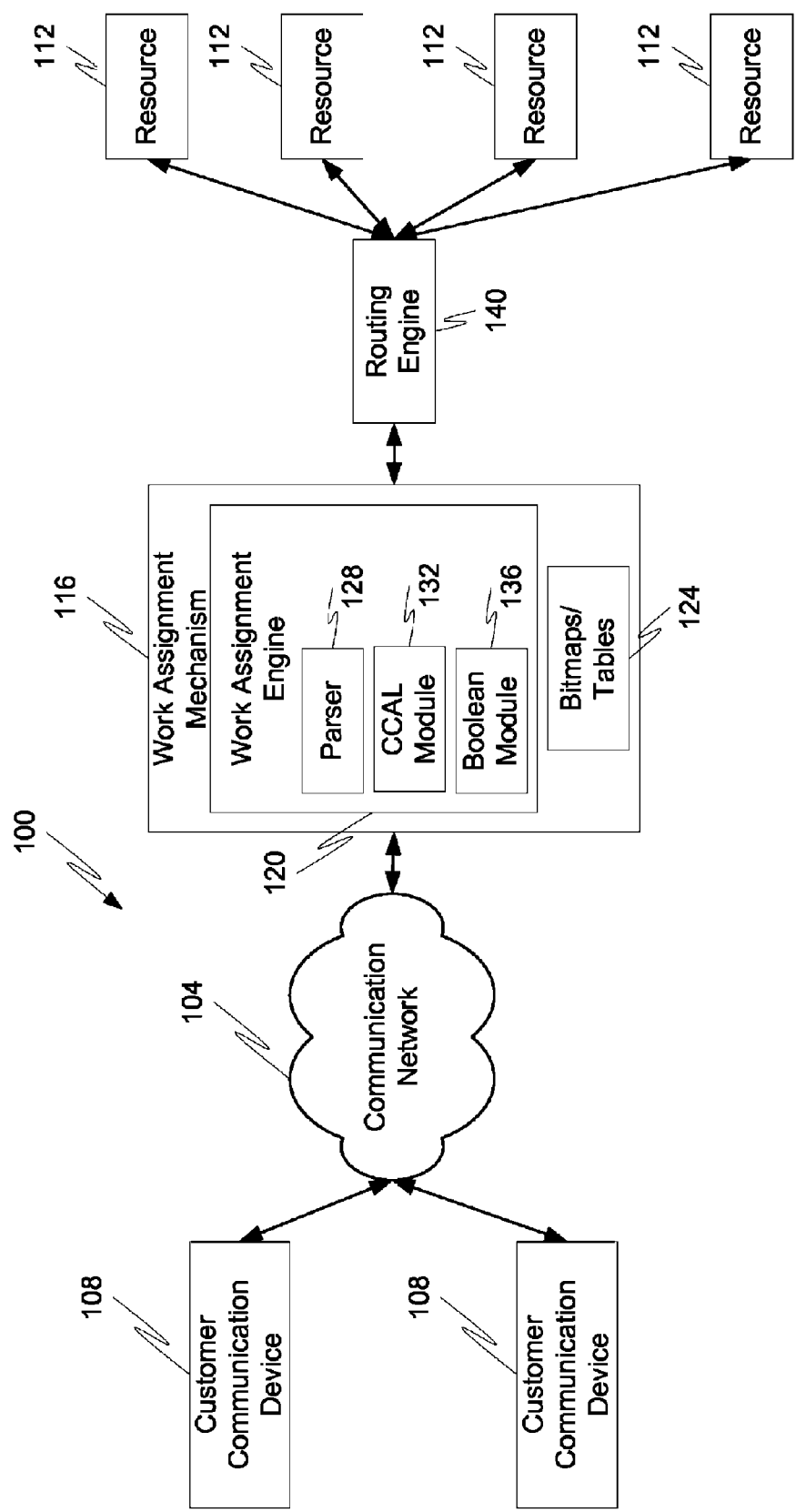
FIG. 1 is a block diagram of a communication system in accordance with embodiments of the present disclosure.

FIG. 1 shows an illustrative embodiment of a distributed communication system 100 in accordance with at least some embodiments of the present disclosure. The communication system 100 comprises a communication network 104 connecting one or more communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116 which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 140 to connect the communication device 108 which initiated the communication with the assigned resource 112.

Although the routing engine 140 is depicted as being separate from the work assignment mechanism 116, the routing engine 140 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 140. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. The work assignment engine 120 may include one or more modules to facilitate the functionality of the work assignment engine 120. Such exemplary modules include, without limitation, a parser 128, a CCAL module 132, and a Boolean module 136.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables 124 and other data structures described herein.

Although the bitmaps/tables 124 are depicted as being included in the work assignment mechanism 116, one skilled in the art will appreciate that the bitmaps/tables 124 can be maintained in a separate database or server that is made accessible to the work assignment mechanism 116.

Furthermore, the work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

The parser 128 may be configured to assist the work assignment engine 120 in translating the instructions prepared by the CCAL module 132. Specifically, the parser 128 may translate outputs of the CCAL module 132, which correspond to the processes and procedures to be performed by the work assignment engine 120. Thus, the parser's 128 primary function may be to convert outputs of the CCAL module 132 into structures or instructions which are executable by the work assignment engine 120. In some embodiments, the parser 128 may be replaced with a CCAL compiler.

Outputs of the CCAL module 132, once in the proper format, enable the work assignment engine 120 to make qualification and eligibility determinations as well as optimal routing decisions. In particular, the parser 128 may be utilized to perform bitmap comparisons and other bit analysis in determining whether a work item can be and should be assigned to a resource 112 or vice versa.

The Boolean module 136 is provided to assist the work assignment engine 120 in scanning large groups of items. Specifically, the Boolean module 136 may enable the work assignment engine 120 during qualification or eligibility determinations to analyze a plurality of work items or resources 112 (or more specifically bit values associated with such items) by computing a Boolean value for a plurality of bits. In some embodiments, the Boolean module 136 is configured to compute an OR or AND function on a plurality of bits and provide the computed value to the work assignment engine 120 which determines if any bits within the plurality of bits require an independent analysis. In some embodiments, the OR function may be used during qualification determinations (because one false bit value can result in the need to analyze all resources or work items within a group of resources or work items) whereas the AND function may be utilized during eligibility determinations (because all true bits may be required for a resource or work item to be considered eligible). In some embodiments, rather than utilizing the Boolean module 136 a non-zero scanner may be utilized to analyze the bit maps during qualification or eligibility determinations.

The CCAL module 132 is provided to enable the work assignment engine 120 to receive rules and goals of a contact center and format such rules into attributes and expressions which can be used to facilitate the queueless contact center architecture proposed herein. In some embodiments, the CCAL module 132 is configured to translate a set of rules and/or goals from one computing language into a second computing language based on its analysis of the inputs, outputs, and variables in the original set of rules and/or goals. The output of the CCAL module 132 may still require further translation by the parser 128.

In accordance with at least some embodiments of the present disclosure, the work assignment mechanism 116 utilizes the bitmaps/tables 124 to determine which work item should be assigned to which resource 112 and vice versa. In other words, the bitmaps/tables 124 are used by the work assignment engine 120 to make routing decisions.

Figure 2:
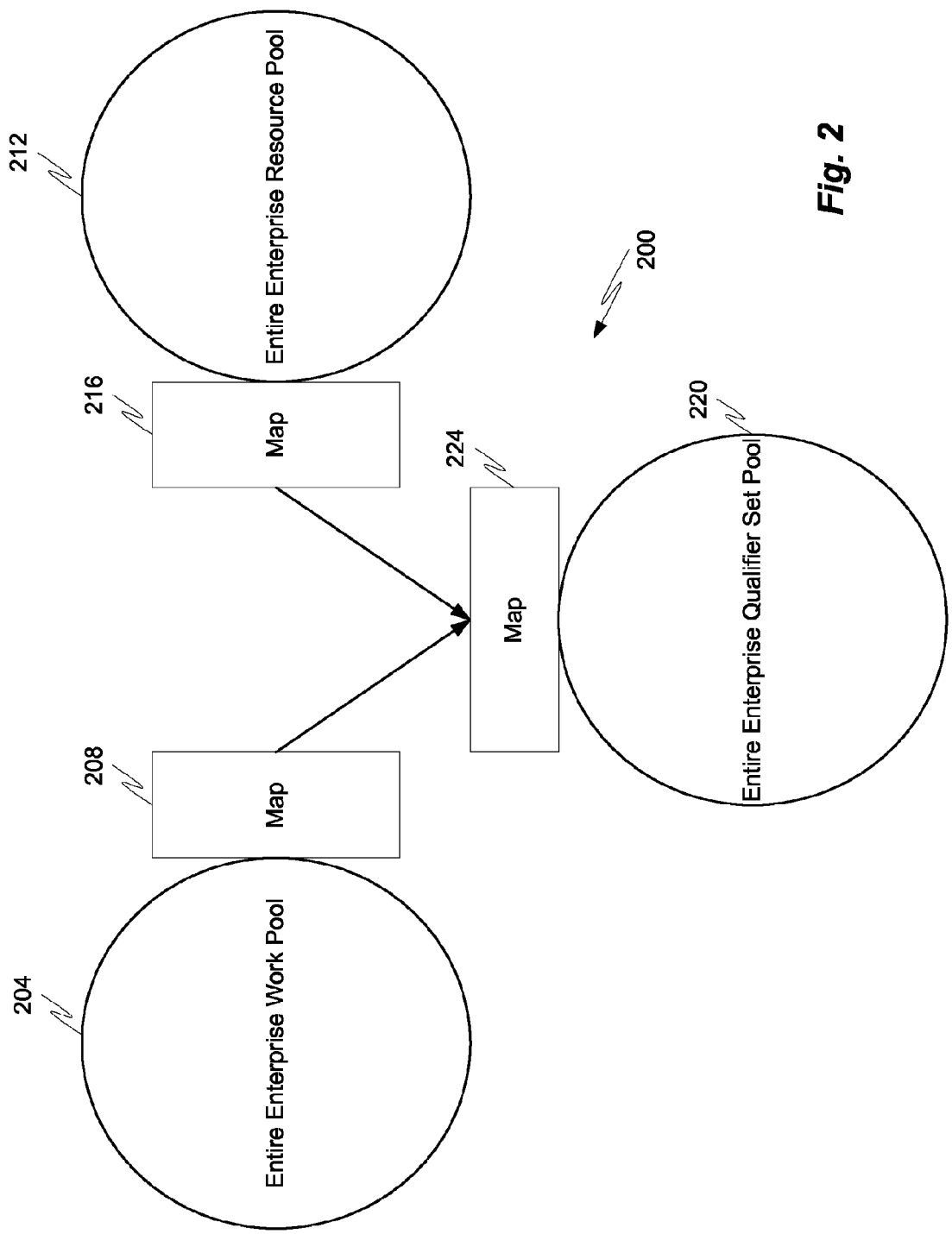
FIG. 2 is a block diagram depicting exemplary pools and bitmaps that are utilized in accordance with embodiments of the present disclosure.

FIG. 2 depicts exemplary data structures 200 which may be incorporated in or used to generate the bitmaps/tables 124 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 2004 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, and/or when rules for administering the contact center have changed).

Figure 3:
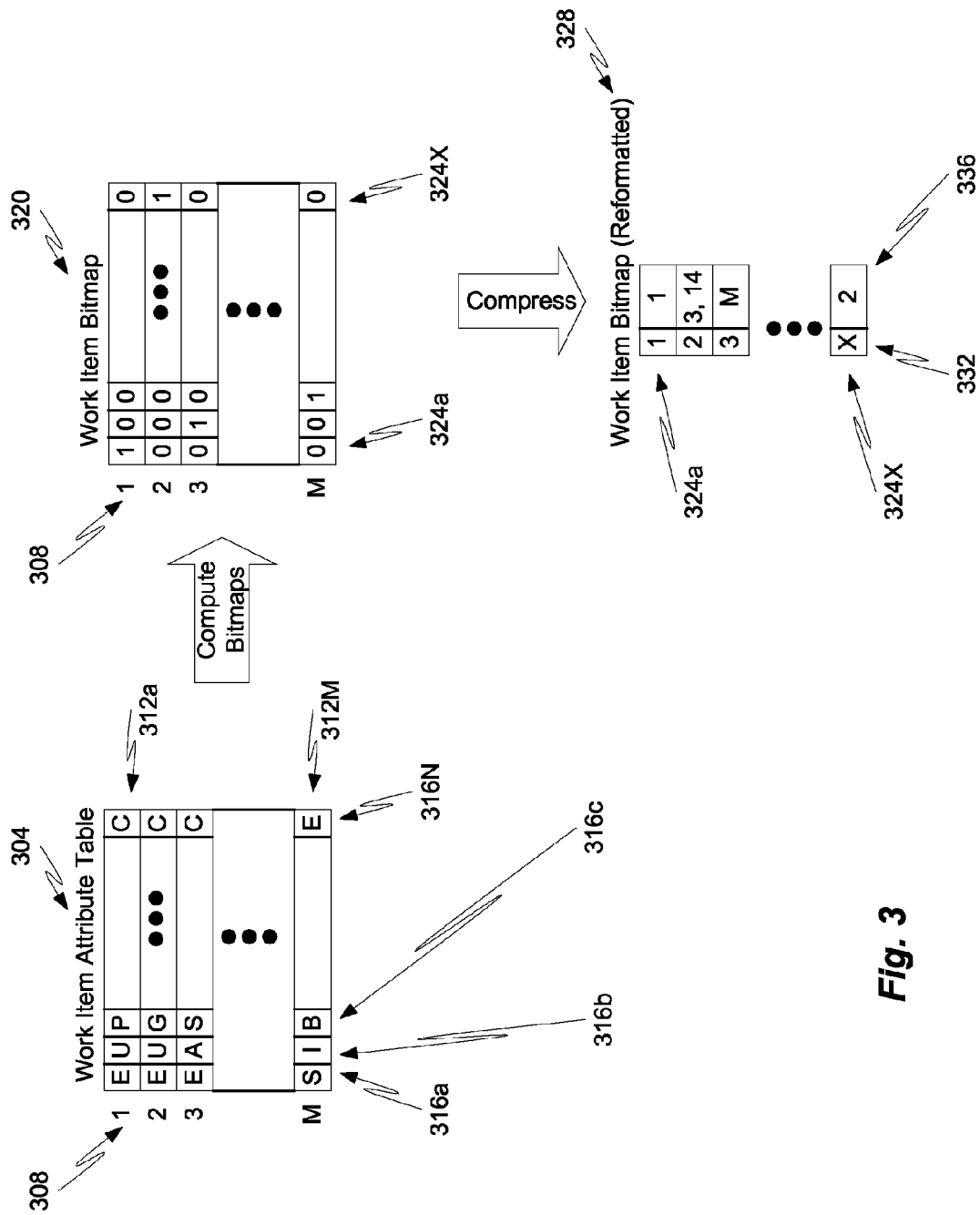
FIG. 3 is a block diagram depicting exemplary work item data structures that can be used in accordance with embodiments of the present disclosure.

With reference now to FIG. 3, additional details of the data structures and algorithms which may be used in calculating the work bitmap 208 will be discussed in accordance with embodiments of the present disclosure. Although the organization of these data structures and data structures for the qualifier set and resources will be described in terms of columns, rows, and entries, one skilled in the art will appreciate that other forms of data manipulation and organization may be utilized without departing from the scope of the present disclosure. Moreover, while only a certain number of entries (e.g., a-M, a-N, a-X, and a-Y) are depicted and described herein, one skilled in the art will appreciate that any number of entries may be utilized to populate the data structures described herein without departing from the scope of the present disclosure.

As noted above, the work pool 204 may correspond to or contain a data structure such as a work item attribute table 304 that contains a data instance 312a-M for each work item attribute combination in the work pool 204. In some embodiments, one work item may only have one attribute combination and, therefore, may be represented by a single data instance 312. However, in some embodiments, a work item may have multiple attribute combinations, in which case multiple data instances 312 are provided in the work item attribute table 304 to represent the work item. Stated another way, each data instance 312a-M corresponds to a specific attribute combination of a work item and may represent attribute combinations of multiple work items if multiple work items share a common attribute combination.

The attribute combination data instances 312a-M are correlated to a combination ID, which may also be utilized as a qualifier set ID for that attribute combination. Additionally, the attribute combination data instances 312a-M each have one or more attributes 316a-N which define the attributes of the data instance 312. Exemplary attributes which may be included in the work item attribute table 304 and thus represent a work item's attribute combination include, without limitation, language preferences or requirements, location/region from where the work item originated, customer type, media type, intent (e.g., service, sales, trouble shooting, billing, etc.), or any other attribute which was traditionally used in determining which queue a work item should be placed in. Advantageously, embodiments of the present disclosure do not utilize queues but rather represent attributes used for routing purposes in work item attribute combinations 312a-M.

The work item attribute table 304 can be converted into a work item bitmap 320, which may be similar or identical to the work bitmap 208 or it may be a less condensed version thereof. The work item bitmap 320 comprises the same attribute combinations 312a-M and their corresponding combination IDs 308 as the work item attribute table 304. However, rather than having attribute types 316a-N in the columns of the table, the work item bitmap 320 comprises work items entries 324a-X. As noted above, each work item in the contact center has at least one attribute combination (i.e., qualifier set requirement) and may possibly have more than one attribute combination. The work item bitmap 320 correlates work items to their corresponding attribute combination(s) by indicating a true value, which may be inverted by an XOR operation (e.g., a '1' may correspond to a true value where '0' is used to represent a false value) at the intersection of a particular work item's entry (e.g., the first work items entry 324a) with that work item's corresponding attribute combination (e.g., the first attribution combination 312a). Accordingly, if a work item has a particular attribute combination, the combination ID corresponding to that attribute combination is correlated to the work item. This correlation establishes a fixed but easily searchable relationship between the work item and its attribute combination(s).

The work item bitmap 320 may be further compressed into a reformatted work item bitmap 328 which may be similar or identical to the work bitmap 208. In some embodiments, the reformatted work item bitmap 328 comprises two columns, a first column 332 corresponding to a work item identifier (i.e., a unique identifier which is assigned to a work item when it enters the contact center) and a second column 336 corresponding the combination IDs 308 which were determined to be true (e.g., have a value of '1' in the work item bitmap 320 where a work item entry 324 intersected with a combination ID 308). A greater or lesser number of columns may be used without departing from the scope of the present disclosure. Regardless of the organization of the data structure, the reformatted work item bitmap 328 correlates a work item to its attribute combination (i.e., processing requirements) by associating the work item identifier 332 with the combination ID 308. This reformatted work item bitmap 328 allows the work assignment engine 120 to quickly scan all work items in the work pool 204 and determine the processing requirements thereof, thereby enabling quick assignment decisions.

The work item bitmap 320 and/or reformatted work item bitmap 328 may also be utilized to generate the qualifier set bitmap 224 which may maintain data related to the attribute combinations 312*a*-N and their corresponding combination IDs 308. Moreover, utilization of the reformatted bitmap 328 conserves memory space in the work assignment mechanism 116, which has traditionally been over-utilized in queue-based contact centers.

Figure 4:
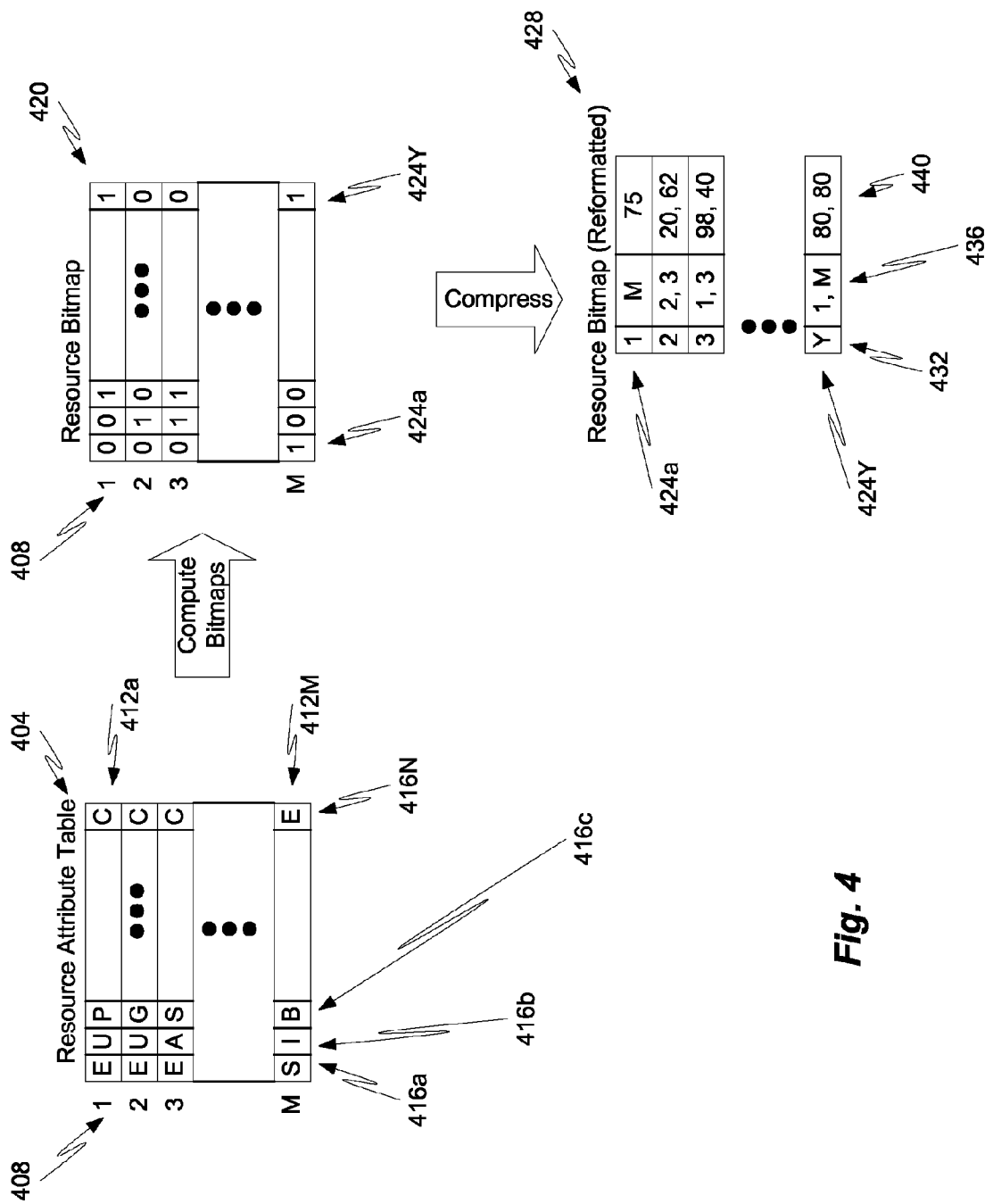
FIG. 4 is a block diagram depicting exemplary resource data structures that can be used in accordance with embodiments of the present disclosure.

With reference now to FIG. 4, additional details of the data structures and algorithms which may be used in calculating the resource bitmap 216 will be discussed in accordance with embodiments of the present disclosure. The resource pool 212 may correspond to or contain a data structure such as a resource attribute table 404 that contains a data instance 412*a*-M for each resource attribute combination in the resource pool 212. In some embodiments, one resource may only have one attribute combination and, therefore, may be represented by a single data instance 412. However, in some embodiments, a resource may have multiple attribute combinations, in which case multiple data instances 412 are provided in the resource attribute table 404 to represent the resource. Stated another way, each data instance 412*a*-M corresponds to a specific attribute combination of a resource (or multiple resources) and may represent attribute combinations of multiple resources if multiple resources share a common attribute combination.

The attribute combination data instances 412*a*-M are correlated to a combination ID 408, which may also be utilized for mapping the attribute combinations of the resources to attribute combinations of the work items via a qualifier set ID in the qualifier set bitmap 224. If an attribute is relatively slow moving (i.e., does not vary frequently over time), then a combination analysis may be utilized. This is traditionally a better option during qualification determinations, which involve the analysis of slow-moving attributes as opposed to eligibility determinations which involve the analysis of faster-moving attributes.

Additionally, the attribute combination data instances 412*a*-M each have one or more attributes 416*a*-N which define the attributes of the data instance 412. Exemplary attributes which may be included in the resource attribute table 404 and thus represent a resource's attribute combination include, without limitation, language capabilities, location/region from where the resource is situated, processing capabilities of the human agent, processing and/or memory capabilities of the resource 112, media type, business-unit (e.g., service, sales, trouble shooting, billing, etc.), or any other attribute which was traditionally used in determining which queue a resource should be placed in. Advantageously, embodiments of the present disclosure do not utilize queues but rather represent attributes of resources used for routing purposes in resource attribute combinations 412*a*-M.

The resource attribute table 404 can be converted into a resource bitmap 420, which may be similar or identical to the resource bitmap 216 or it may be a less condensed version thereof. The resource bitmap 420 comprises the same attribute combinations 412*a*-M and their corresponding combination IDs 408 as the resource attribute table 404. However, rather than having attribute types 416*a*-N in the columns of the table, the resource bitmap 420 comprises resource entries 424*a*-Y. As noted above, each resource in the contact center has at least one attribute combination (i.e., qualifier set) and may possibly have more than one attribute combination. The resource bitmap 420 correlates resources to their corresponding attribute combination(s) by indicating a true value at the intersection of a particular resource's entry (e.g., the first resource's entry 424*a*) with that resource's corresponding attribute combination (e.g., the Mth attribution combination 412M). Accordingly, if a resource has a particular attribute combination, the combination ID corresponding to that attribute combination is correlated to the resource. This correlation establishes a fixed but easily searchable relationship between the resource and its attribute combination(s).

The resource bitmap 420 may be further compressed into a reformatted resource bitmap 428 which may be similar or identical to the resource bitmap 216. In some embodiments, the reformatted resource bitmap 428 comprises two or more columns, a first column 432 corresponding to a resource identifier (i.e., a unique identifier which is assigned to a resource when it enters the contact center) and a second column 436 corresponding the combination IDs 408 which were determined to be "true" (e.g., have a value of '1' in the resource bitmap 420 where a resource entry 424 intersected with a combination ID 408). These first two columns may be utilized by the work assignment engine 120 to determine whether a resource 112 is eligible to be assigned to a work item and vice versa (e.g., for utilization in qualification determinations).

A third column 440 may also be provided to identify the suitability of a particular resource 112 for each of its attribute combinations. Accordingly, if a resource 112 only has a single attribute combination, then the suitability column 440 for that resource entry 424 may only have a single suitability value. Alternatively, if a resource 112 has multiple attribute combinations, then the suitability column 440 for that resource entry 424 may have multiple suitability values, one for each attribute combination.

Accordingly, the reformatted resource bitmap 428 correlates a resource to its attribute combination (i.e., processing requirements) by associating the resource identifier 432 with the combination ID 408 and may also provide information regarding the resources 112 suitability for its attribute combination(s). This reformatted resource bitmap 428 allows the work assignment engine 120 to quickly scan all resources 112 in the resource pool 212 and determine the processing capabilities and/or suitabilities thereof, thereby enabling quick work item routing decisions.

Figure 5:
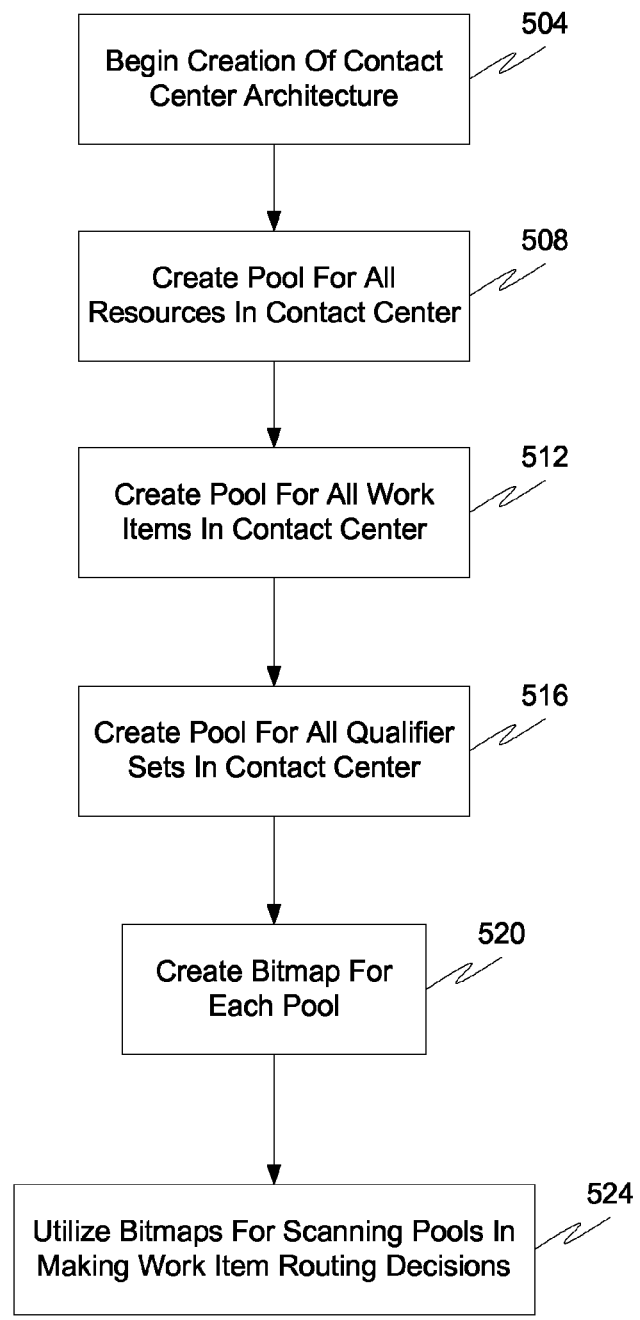
FIG. 5 is a flow diagram depicting an exemplary contact center architecture creation method in accordance with embodiments of the present disclosure.

Referring now to FIG. 5, an exemplary method of creating a queueless contact center architecture will be described in accordance with embodiments of the present disclosure. The method is initiated when it is determined that the contact center architecture is to be created (step 504). The method continues with the creation of a resource pool 212 for all resources in the contact center (step 508), a work pool 204 for all work items in the contact center (step 512), and, optionally, a qualifier set pool 220 for all qualifier sets in the contact center (step 516). The decision to create the qualifier set pool 220 may depend upon the number of resources 112, work items, or excepted resources 112 and work items to be included in the contact center. If the number of resources 112 and/or work items is going to be relatively low (e.g., less than 10,000 total items), then a qualifier set pool 220 may not necessarily be required and mapping may be performed directly between the work pool 204 and resource pool 212. However, the qualifier set pool 220 is particularly useful to facilitate work item/resource assignment decisions in large contact centers.

After the pools of items have been created, the method continues with the creation of bitmaps for each pool (step 520). The bitmaps condense the items within the pool and distil the information related to each item down to the necessary attributes which are considered pertinent to work item/resource assignment decisions. Once created, the bitmaps can be used by the work assignment engine 120 to scan the various pools in making work item routing decisions as will be discussed in further detail below (step 524).

Figure 6:
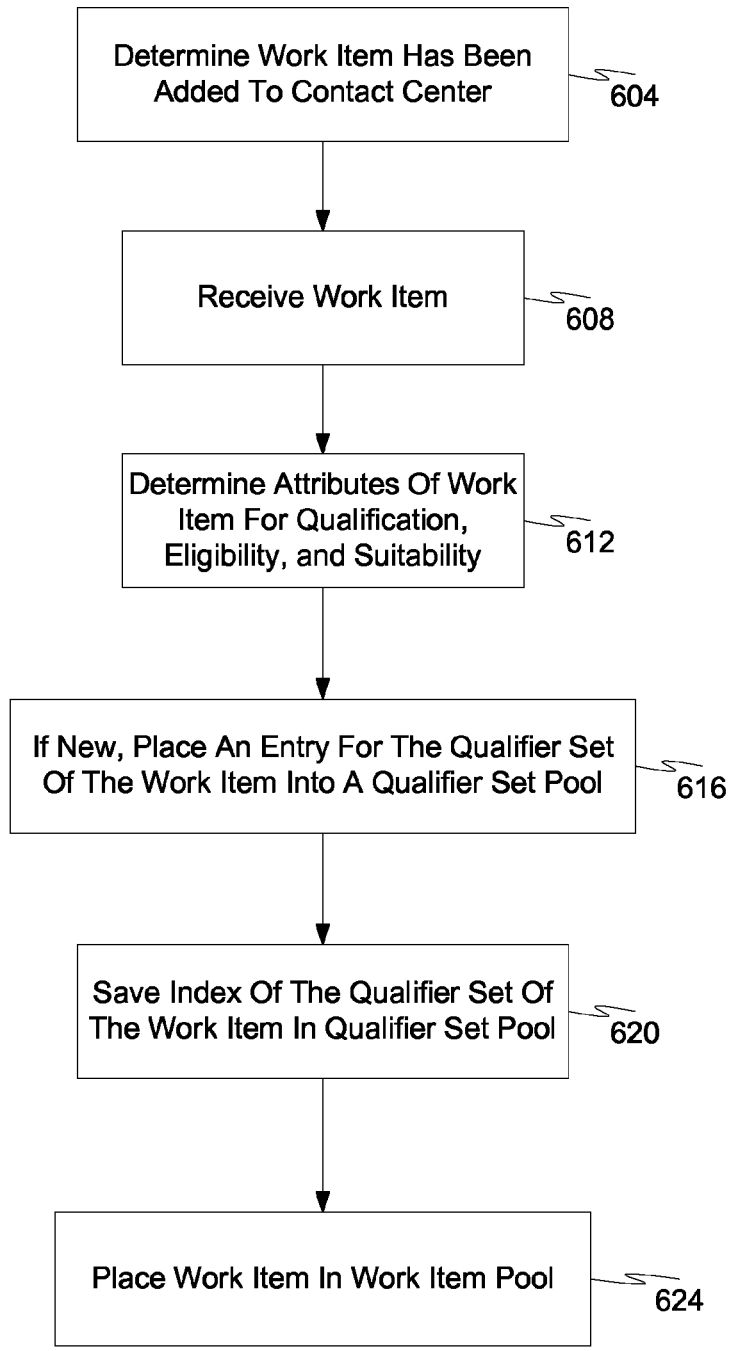
FIG. 6 is a flow diagram depicting an exemplary method of treating work items which are added to a contact center in accordance with embodiments of the present disclosure.

Referring now to FIG. 6, an exemplary method of adding work items to a contact center will be described in accordance with at least some embodiments of the present disclosure. The method is initiated when it is determined that a new work item has been added to the contact center (step 604). This determination may be made upon detecting that a new communication has been received at the contact center and more specifically at the work assignment mechanism 116. In some embodiments, the work item is generated by the contact center device which initially receives the communication (e.g., a server, switch, or the like) which maintains the communication but generates a logical representation of the communication in the form of a work item which is transmitted to the work assignment mechanism 116. Upon creation of the work item a work item identifier may be assigned to the work item to help uniquely identify the work item within the contact center during its existence in the contact center.

After the work item has been generated, the work item is received at the work assignment engine 120 (step 608) which determines the attributes of the work item (step 612). In some embodiments, the work assignment engine 120 itself may be configured to determine the processing requirements of the work item and further determine which of those processing requirements and/or preferences are utilized by the contact center for qualification purposes (i.e., which attributes are accounted for in the work item attribute table 304). Alternatively, or in addition, the device that initially received the communication and/or generated the work item may determine the necessary attributes for the work item. Alternatively, or in addition, the work assignment engine 120 may initially assign the work item when it is first received to a resource 112 which is capable of determining attributes for the work item. As one example, the work item may be assigned to an IVR which can query the customer for processing requirements. As another example, the work item may be assigned to a server which can reference a Customer Relationship Management (CRM) database in the contact center to determine if the customer who initiated the communication has already been stored in the contact center. Combinations of the above examples may also be utilized to determine attributes of work items for qualification purposes.

Once the appropriate attributes, and particularly the attribute combination(s) 312, representing the work item's processing requirements have been determined, the method continues by placing an entry for the attribute combination 312 into the qualifier set pool 220 (step 616), if that attribute combination 312 is not already in the qualifier set pool 220, and assigning that particular attribute combination 312 a combination ID 308 (step 620). The combination ID 308 of the new attribute combination 312 is stored in the qualifier set pool 220 and/or qualifier set bitmap 224 along with the properties of the attribute combination 312 to maintain a logical relationship between the attribute combination and its identifier. Before, during, or after steps 616 and/or 620, the method also places a work item entry 324 for the work item into the work pool 204 (step 624). In particular, this step may involve generating the work item entry 308, 324 in a work item bitmap 320 and determining which of the attribute combinations in the contact center the work item evaluates as true. This determination may be maintained in the work item bitmap 320 as long as the work item remains in the contact center or until the rules regarding work item/resource assignment have changed.

Figure 7:
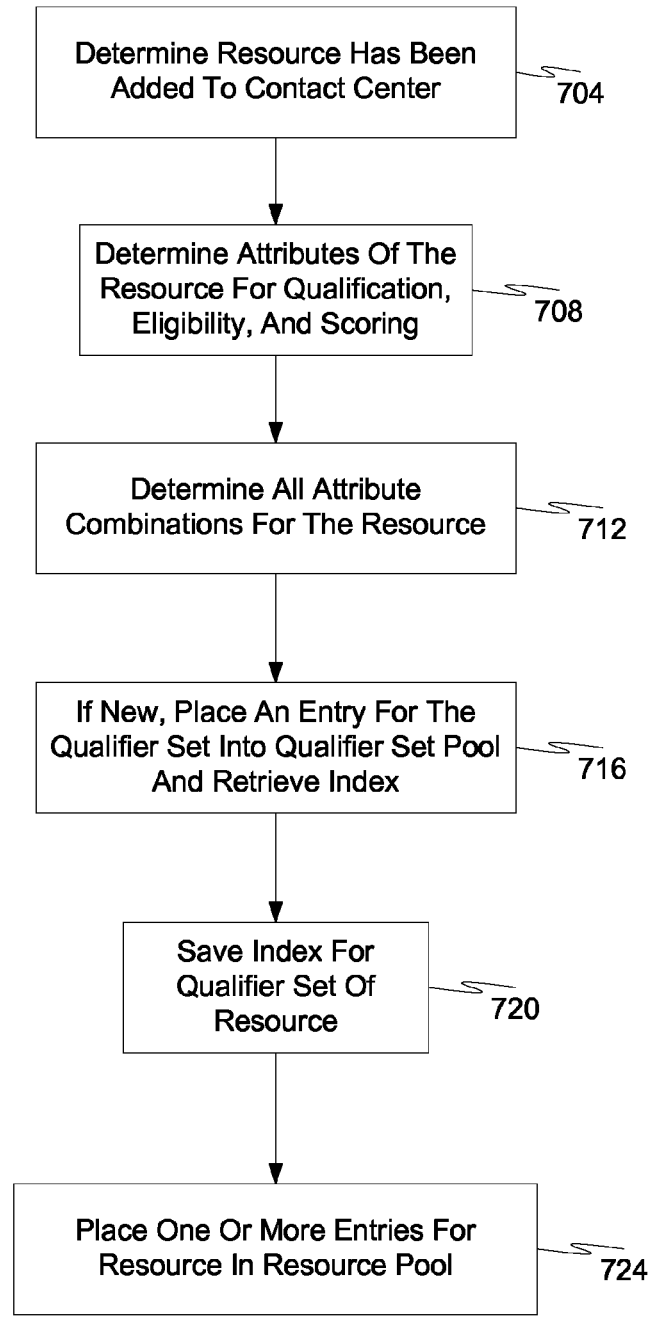
FIG. 7 is a flow diagram depicting an exemplary method of treating resources which are added to a contact center in accordance with embodiments of the present disclosure.

Referring now to FIG. 7, an exemplary method of adding resources to a contact center will be described in accordance with at least some embodiments of the present disclosure. The method begins when it is determined that a new resource has been added to the contact center (step 704). This determination may be made when a resource is added to the contact center by an administrator (e.g., a phone is plugged into a port, a computer is connected to a network interface, a human agent is registered into an appropriate agent database, etc.). This determination may additionally or alternatively be made when an already registered human agent logs into or otherwise actively registers with the contact center (e.g., by establishing a Virtual Private Network (VPN) connection with the network to which the work assignment mechanism 116 is connected.

After the resource has been added to the contact center, the attributes of the resource 112 for qualification purposes are determined (step 708). Alternatively, or in addition, this step may be performed when there is an administrative change, a change in time resulting in an attribute value change, a change in agent state, or any other change resulting from the occurrence of an event. In particular, the attribute combination(s) 412 for the newly added resource 112 is determined. In some embodiments, the work assignment mechanism 116 is configured to determine the attribute combination(s) 412 for the resource. Alternatively, this information may be administratively provisioned in an enterprise database and retrieved by the work assignment mechanism 116. In addition to determining the attributes for routing qualifications, all other attribute combinations (which may not be directly applicable to routing qualifications) are determined for the resource 112 (step 712).

For each of the new determined attribute combinations of that resource 112, an entry is placed into the qualifier set pool and a corresponding combination ID is retrieved (step 716). This combination ID (which may also be referred to as a qualifier set index when referring to the resource 112) is stored in the data entry 424 for that resource (step 720) and the associated combination ID(s) 436 for the resource are stored in one or both of the resource pool 212, resource bitmap 216, 420, and reformatted resource bitmap 428 along with a unique resource ID 432 assigned to the resource 112 and with any suitability information, if such information is known (step 724).

Figure 8:
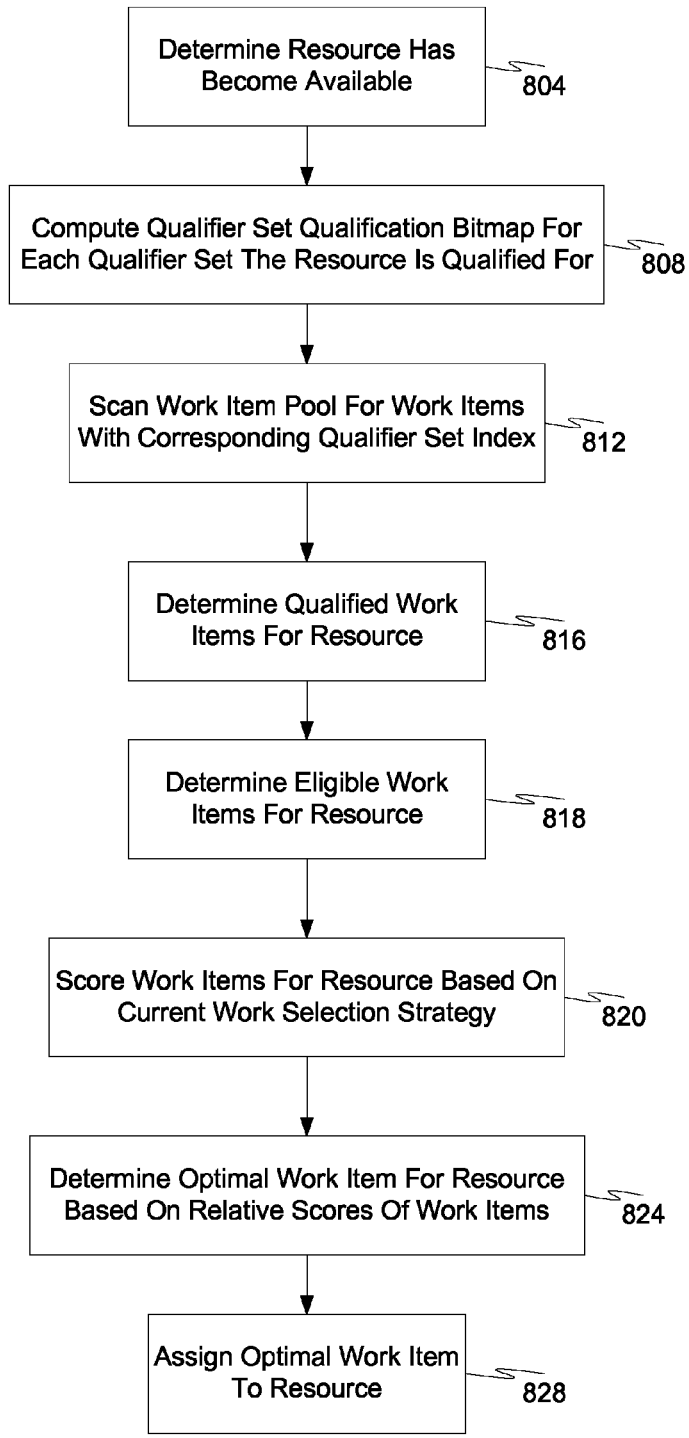
FIG. 8 is a flow diagram depicting an exemplary method of handling a work item surplus state in a contact center in accordance with embodiments of the present disclosure.

With reference now to FIG. 8, an exemplary method of handling a work item surplus state in a contact center will be described in accordance with at least some embodiments of the present disclosure. The method begins when it is determined that a resource 112 has become available (step 804). This determination may occur when a resource 112 or an agent using a resource has logged into the contact center or immediately after a resource 112 has finished servicing a work item.

Advantageously, the work assignment engine 120 is capable of considering every single work item in the contact center, or at least every work item in the work pool 204, for assignment to the newly available resource 112. This enables true one-to-one matching and further facilitates optimal assignment of work items to a resource 112 based on the capabilities or attributes of the resource 112.

The method continues with the work assignment engine 120 computing a qualifier set qualification bitmap (i.e., one or more of resource bitmap 216, 420 and reformatted resource bitmap 428) for each qualifier set that the resource 112 is qualified for (step 808). In some embodiments, a resource 112 may only have one attribute combination as its qualifier set qualification. In some embodiments, a resource 112 may have multiple attribution combinations for which it is qualified.

Based on the bitmap which was computed for the resource 112, the method continues by scanning the work pool 204, or more particularly a bitmap computed for the work pool 204 (e.g., work bitmap 208, work item bitmap 320, and/or reformatted resource bitmap 328), for work items having an attribute combination that matches the attribute combination of the resource 112 (step 812). This analysis may be performed by analyzing one work item data entry at a time or by analyzing a group of work item data entries to see if any work items in the group of work items is qualified to be assigned to the resource 112. In some embodiments, parallel processing may be utilized to further increase the speed with which bitmaps are scanned. Specifically, data entries can be grouped according to processing mechanisms rather than other logical groupings, thereby creating highly parallelized groups. This allows a large group of bits to be evaluated simultaneously by a GPU, for example. If a GPU is used, then the Boolean module 136 may be provided as a separate piece of hardware from the work assignment engine 120.

If during the group analysis it is determined that at least one work item is qualified for assignment to the resource 112, then a work item-by-work item analysis of every work item in the group may be performed to identify the work item(s) which are qualified for the resource 112. If, however, it is determined that the entire group of work items is not qualified for assignment to the resource 112, then no work item in that group requires an individual analysis and the next group of work items can be analyzed.

In some embodiments, the combination IDs 408 for which the resource 112 is qualified to handle will be compared to combination IDs 308 in the work item bitmap. If the combination ID 408 for the resource matches a combination ID 308 in the work item bitmap, the work item having the corresponding combination ID 308 will be considered as a qualified work item for the resource 112 (step 816).

The method continues with the work assignment engine 120 analyzing the qualified work items for eligibility (step 818). During this step, values for fast moving attributes may be computed and inserted into the appropriate bitmap location before the bitmaps are analyzed. Attributes which may be computed and analyzed during the eligibility step include, without limitation, work item availability (based on whether the work item is already assigned to another resource 112), actual work item wait time, contact center state (based on whether the contact center is on schedule, behind schedule, projected to get behind schedule etc.), and the like. If a work item is determined to be currently ineligible for assignment to the resource 112, then the ineligible work item is removed from further consideration.

The method then continues by scoring work items for the resource 112 based on the suitability of the resource 112 as well as based on any other work selection strategies that are known to the work assignment engine 120 (step 820). For example, if multiple work items are equally suitable for assignment to a resource 112, then the work item which has been waiting longer for assignment to a resource may be assigned a higher score.

Based on the relative scores of the work items, the work assignment engine 120 selects the optimal work item(s) from among the qualified and eligible work items (step 824) and assigns the optimal work item to the resource 112 (step 828). The assignment step may include transferring the communication associated with the work item to the resource 112 with the routing engine 140 (e.g., connecting a customer communication device 108 with a resource 112 for a realtime communication session, forwarding an email communication to the resource 112, forwarding a text message to the resource 112, transferring customer data to the resource, combinations thereof, and the like).

Figure 9:
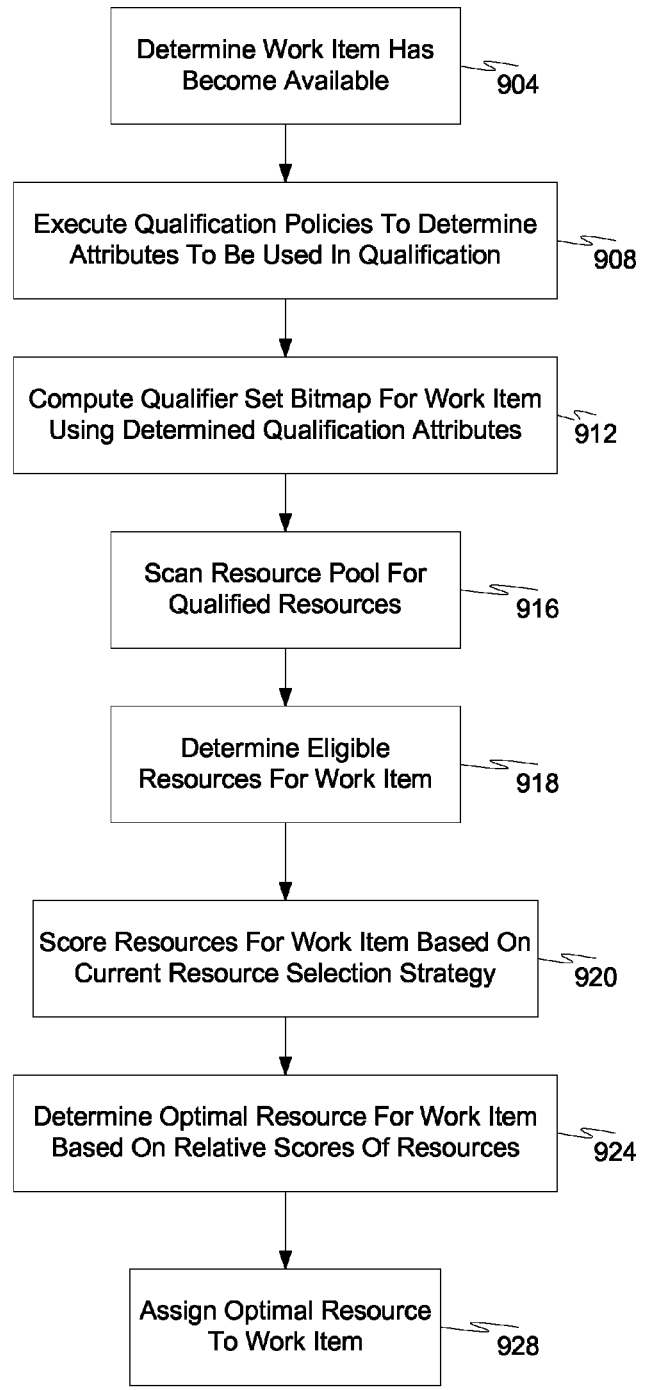
FIG. 9 is a flow diagram depicting an exemplary method of handling a resource surplus state in a contact center in accordance with embodiments of the present disclosure.

Referring now to FIG. 9, an exemplary method of handling a resource surplus state in a contact center will be described in accordance with embodiments of the present disclosure. The method begins when it is determined that a work item has become available (step 904). This determination may occur when a new work item is received in the contact center or after a work item has been partially serviced by one resource and still requires further processing.

The method continues with the work assignment engine 120 executing qualification policies to determine attributes which will be used in assessing resource qualification for the work item (step 908). In particular, a first set of attributes may be used in assessing qualification for a first predetermined amount of time after the resource surplus has been detected but those qualification attributes may change to a second set of attributes after the first predetermined amount of time has lapsed. For example, language attributes may initially be considered in the qualification attributes, but after a predetermined amount of time has lapsed, the language attributes may be excluded from the qualification attributes so that resource considerations can be expanded.

Once the qualification attributes have been selected, the method continues with the work assignment engine 120 computing a qualifier set bitmap for the work item using the determined qualification attributes (step 912). In this step, the work assignment engine 120 determines which attribute combination 312 or combinations will be used in assessing the assignment possibilities for the work item.

After the attribute combination 312 for use in resource qualification assessment has been determined, the work assignment engine 120 retrieves the associated combination ID 308 from the qualifier set bitmap 224 and scans the resources of the contact center for qualified resources 112 (step 916). In this step, the work assignment engine 120 is able to consider every single resource 112 in the contact center without regard for a queue structure or any other artificial limitation. This enables the work assignment engine 120 to achieve optimal assignment decisions and true one-to-one work item assignment. In some embodiments, the scanning step includes assessing one or more resource bitmaps 216, 420 or the reformatted resource bitmap 428.

Additionally, and similar to the qualification analysis in the work item surplus state, the work assignment engine 120 may analyze each resource 112 individually for qualification purposes or the work assignment engine 120 may, with the help of the Boolean module 136, analyze the resources 112 in groups to determine if any resource 112 within the group requires further analysis. If a group is determined to have no qualified resources 112, then the work assignment engine 120 may continue by analyzing the next group instead of having to analyze every single resource 112 individually. This is particularly useful to speed up the qualification analysis because most resources 112 will likely not be qualified to handle a particular work item and can, therefore, be quickly eliminated before further analysis is performed.

The resources 112 which are determined to be qualified to process the work item (e.g., by virtue of having the selected attribute combination ID evaluate as true in the resource bitmap 420 and/or reformatted resource bitmap 428) are then further analyzed for eligibility (step 918). The eligibility determination involves the work assignment engine 120 analyzing the qualified resources for eligibility. During this step, values for fast moving attributes may be computed and inserted into the appropriate bitmap location before the bitmaps are analyzed. Attributes which may be computed and analyzed during the eligibility step include, without limitation, resource availability (based on whether the resource is already assigned to another work item or whether the resource is logged-in), resource idle time, contact center state (based on whether the contact center is on schedule, behind schedule, projected to get behind schedule etc.), and the like. If a resource is determined to be currently ineligible for assignment to the work item, then the ineligible resource is removed from further consideration.

The method continues with the work assignment engine 120 scoring the qualified and eligible resources for the work item based on the current resource selection strategy and/or the suitability of the resource 112 for handling that particular type of attribute combination (step 920). Based on the relative scores of the resources 112, an optimal resource is determined (step 924) and the work item is assigned to the optimal resource 112 (step 928), thereby achieving true one-to-one matching in the contact center. In some embodiments, the work item is also routed to the optimal resource 112.

Figure 10:
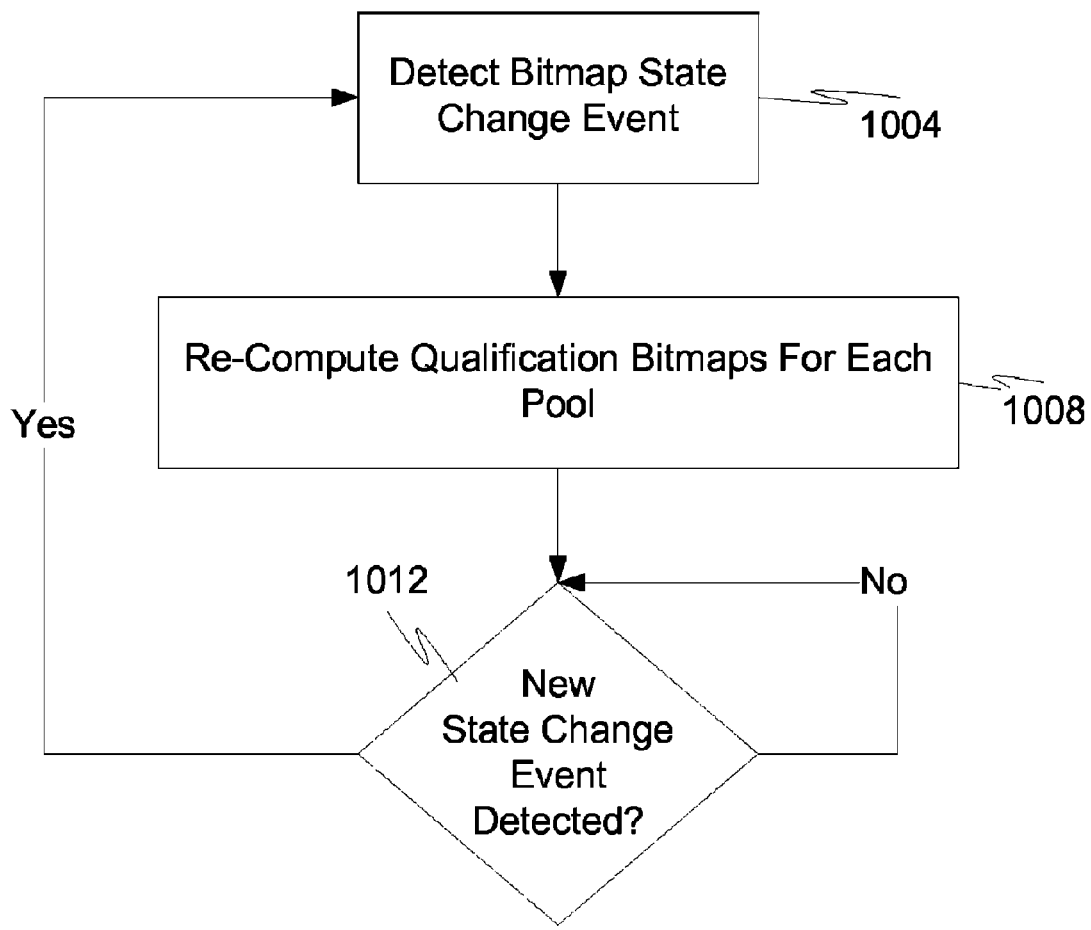
FIG. 10 is a flow diagram depicting an exemplary bitmap management method in accordance with embodiments of the present disclosure.

With reference now to FIG. 10, an exemplary method of managing bitmaps in a contact center will be described in accordance with at least some embodiments of the present invention. One purpose of the bitmap operations discussed herein is to store the pre-computed results of one or more qualification rules. In resource surplus, a work item uses the qualifier set bitmap to select qualified resources and uses the resource bitmap to select the ones that are really eligible. In a work surplus situation, the resource uses the qualifier set bitmap to select qualified work. Optionally, it can use the work item bitmap to test the work to see if it can be processed (eligible to process). For simple work assignment utilization of the work item bitmap may not be necessary.

It is for this purpose that bitmaps having mostly false values (e.g., '0' values) are used in making work item/resource assignment decisions. Generally speaking, business rules and performance goals can be considered when determining which attributes will be and will not be included in an attribute combination. The attributes considered within an attribute combination may also vary over time and based on a contact center's state.

The method begins when a bitmap change event is detected by the work assignment engine 120 (step 1004). Exemplary types of bitmap change events include, without limitation, determining that a new business rule or strategy (which is a collection of rules) should be implemented in making work item/resource assignment decisions, determining that new performance goals are desired for the contact center (e.g., minimize work item wait time instead of maximize resource 112 utilization), determining that a predetermined amount of time has passed since the state of a contact center has changed, determining that a predetermined amount of time has passed since an assignment of a work item to a resource has been made, determining that new resources and/or work items have been added to the contact center, or any other event which may require consideration of a different attribute that is not currently included in the qualification attribute combination.

Once such an event is detected, the method continues with the work assignment engine 120 re-computing qualification bitmaps for each pool 204, 212, 220 (step 1008). In the step, the work assignment engine 120 utilizes the new attribute combination which was determined based on the state change event to calculate the new bitmaps that can be used in making work item/resource assignment decisions. The method then waits until a new state change event is detected before the qualification bitmaps are re-computed again (step 1012).

Figure 11:
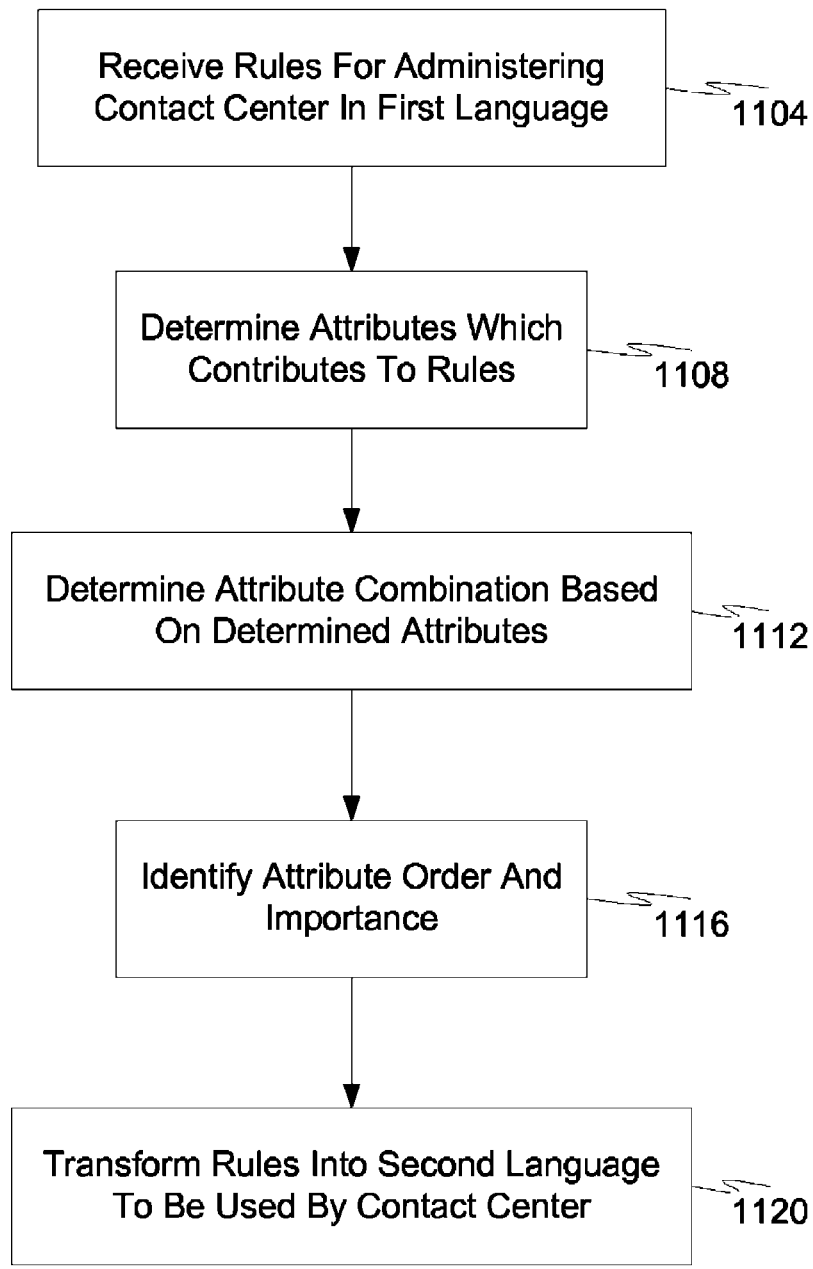
FIG. 11 is a flow diagram depicting an exemplary contact center rule management method in accordance with embodiments of the present disclosure.

Referring now to FIG. 11, an exemplary method of managing contact center rules will be described in accordance with at least some embodiments of the present invention. The method is initiated when rules for administering the contact center are received in a first language (step 1104). These rules may contain Boolean expressions, thresholds, policy objectives and goals, optimization goals, and other forms of rules which are traditionally used to manage contact centers. In some embodiments, the rules may be received at the work assignment mechanism 116 which includes a Contact Center Algorithm Language (CCAL) module that can populate, organize, and manage the pools 204, 212, 220 and bitmaps used in a queueless contact center. In some embodiments, the CCAL module 132 may be maintained in a different server that is in communication with the work assignment mechanism 116. CCAL is a domain-specific language and the CCAL module 132 may be configured to write the rules which populate the pools 204, 212, 220 with work items, resources, and qualifier sets.

After the rules have been received at the CCAL module 132, the method continues with the CCAL module 132 determining attributes which contribute to the rules by analyzing the input and output structure of the rules, variables contributing to the rules, thresholds related to the rules, and the like (step 1108). Thereafter, the particular attribute combination that will be used to implement the rules is determined by the CCAL module 132 (step 1112). Additionally, the CCAL module 132 can identify an order of importance for the attributes in the attribute combination (step 1116). The determined order is used to identify the location for each attribute in the associated attribute tables 304, 404.

Thereafter, the CCAL module 132 transforms the rules into a second language by generating code and the program which are responsible for implementing the rules and generating the bitmaps as conditions of the contact center change (step 1120).

Figure 12:
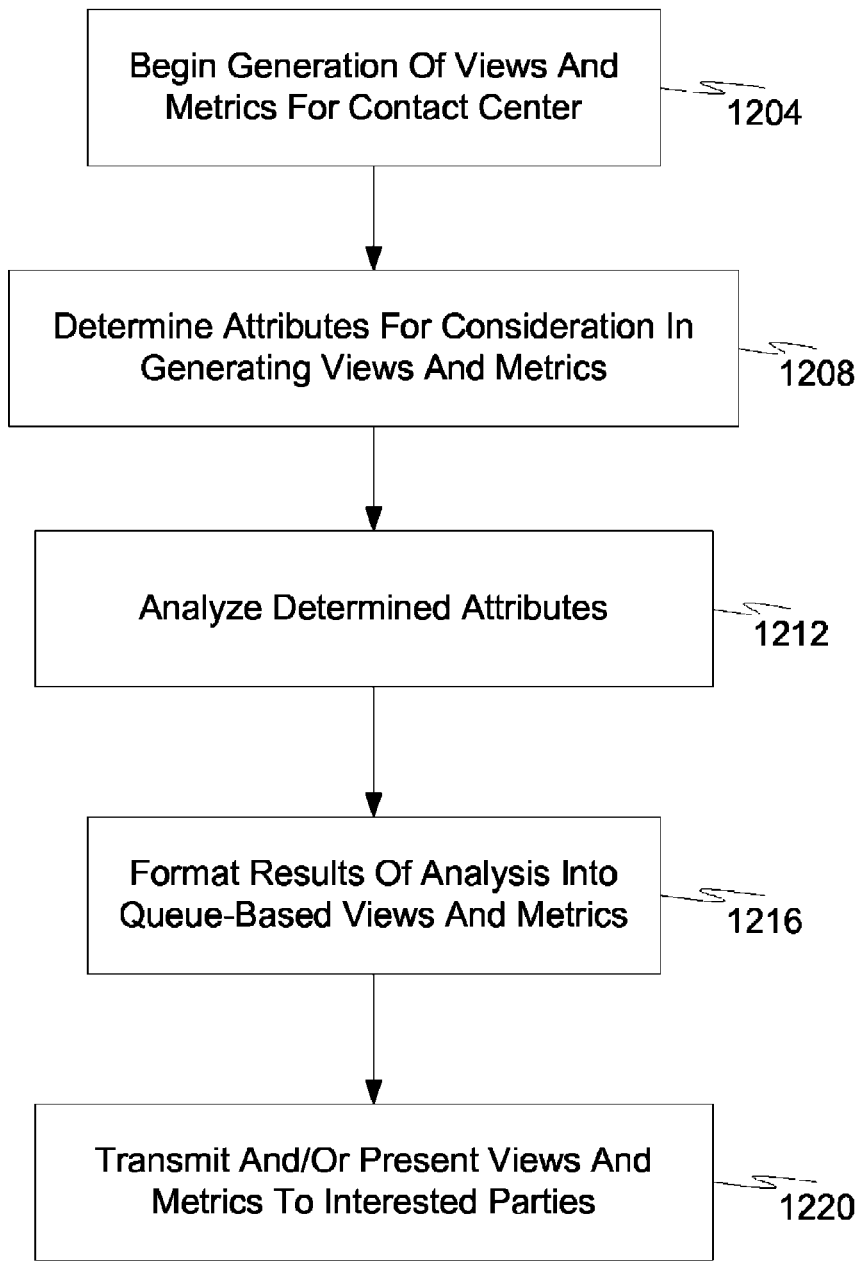
FIG. 12 is a flow diagram depicting an exemplary contact center performance view and metric generation method in accordance with embodiments of the present disclosure.

With reference now to FIG. 12, an exemplary method of generating performance views and metrics for a queueless contact center will be described in accordance with at least some embodiments of the present disclosure. One unique aspect of implementing a queueless contact center is that many existing queue-based contact centers have management and administrative infrastructure already in place. This means that in transferring from a queue-based contact center to a queueless contact center will involve the need to minimize disruption due to the transfer. One aspect of the present disclosure provides the ability to generate performance views and metrics for a queueless contact center that represent performance views and metrics generated in a traditional queue-based contact center. In some embodiments, the CCAL module 132 is responsible for defining view and analysis metrics to determine optimal structures to support the desired views. These determinations may be incorporated into the output of the CCAL module 132 which controls the operation of the work assignment engine 120.

The method begins when it is determined that views and metrics of the contact center are to be generated (step 1204). Generation of views and metrics may be performed continuously, periodically, or sporadically (e.g., on an as-needed basis or as-requested basis). The mechanism which generates the views and metrics of the contact center performance may comprise the work assignment engine 120 or some other performance analysis module contained in the work assignment mechanism 116. In some embodiments, however, a performance analysis module may be contained in a different server that is external to the work assignment mechanism 116.

The method continues by determining attributes which will be considered in the process of generating views and metrics (step 1208). As can be appreciated, different attributes of work items and/or resources will be considered depending upon the type of view and metric that is currently being generated. For example, if views and metrics related to Estimated Wait Time (EWT) for work items having a particular processing requirement (e.g., billing questions) are desired, then the attributes related to wait time until a work item was assigned and attributes related to intent may be the two types of attributes which are analyzed within the work pool 204. As another example, if views and metrics related to agent utilization for a specific qualifier set are desired, then attributes related to the qualifier set of interest and time engaged with a work item may be some of the attributes analyzed within the resource pool 212.

Accordingly, after the attributes for consideration have been determined, the method continues by analyzing the determined attributes from the appropriate population of items in the contact center (step 1212). In analyzing the contact center items, all pools of items may be analyzed or just the pools having the items of interest may be analyzed.

Results of the analysis may then be formatted into a queue-based view and metric report (step 1216). As one example, this formatting may include designating a particular set of resources 112 as being agents within a particular "skill-based queue" and then displaying the views and/or metrics determined for that set of resources 112 as if the agents were actually in an agent queue, even though they are not.

After the results have been properly formatted, the method continues by transmitting and/or presenting the views and metrics to one or more interested parties (step 1220). This step may include automatically sending an electronic version of the performance report to one or more users designated as interested parties. This step may also include rendering a display of the report via a user interface of a communication device and/or printing a physical report on paper. Other methods of transmitting and presenting views and metrics may also be utilized without departing from the scope of the present disclosure.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:
1. A method, comprising:
receiving, at a work assignment engine, a work item;
considering, by the work assignment engine, every resource in a resource pool as a potential resource for assigning to the work item, wherein resources in the resource pool that are considered as a potential resource include available, non-available, qualified and non-qualified resources;

determining, by the work assignment engine, a selected resource from the resource pool for processing the work item; and assigning, by the work assignment engine, the work item to the selected resource, wherein determining a selected resource from the resource pool comprises:

determining an attribute combination for the work item, wherein the attribute combination for the work item comprises one or more attributes associated with processing requirements of the work item;

analyzing every resource in the resource pool to determine whether each resource comprises an attribute combination sufficient to fulfill the processing requirements of the work item as determined by the attribute combination of the work item;

based on the analyzing step, determining a group of qualified resources that have the requisite attribute combination; and analyzing one or more attributes of each resource in the group of qualified resources to determine the selected resource.

2. The method of claim 1, wherein the resource pool comprises every resource in a contact center and wherein the resource pool comprises an unordered collection of every resource in the contact center.

3. The method of claim 2, further comprising:
receiving a communication at the contact center; and
generating the work item in the contact center, the work item representing the communication as a processing task in the contact center.

4. The method of claim 3, wherein the work item is generated by the work assignment engine.

5. The method of claim 2, wherein the selected resource is an optimal resource at the time of determining and is selected from a group of qualified and eligible resources and wherein the group of qualified resources is determined via the considering step.

6. The method of claim 1, wherein assigning the work item to the selected resource comprises at least one of transferring a non-realtime communication associated with the work item to the selected resource and establishing a realtime communication channel between an initiator of the work item and the selected resource.

7. The method of claim 1, wherein analyzing every resource in the resource pool comprises scanning a resource bitmap which correlates a resource to an attribute combination.

8. The method of claim 1, wherein each resource in the group of qualified resources comprises an attribute combination equal to the attribute combination of the work item and are further analyzed for eligibility prior to determining the selected resource.

9. A method, comprising:
determining, by a work assignment engine, that a resource has become available;
considering, by the work assignment engine, every work item in a work pool as a potential work item for assigning to the resource, wherein work items in the work pool that are considered as a potential work item for assigning to the resource include assigned and unassigned work items;
determining, by the work assignment engine, a selected work item from the work pool for assigning to the resource; and assigning, by the work assignment engine, the selected work item to the resource, wherein determining a selected work item from the work pool comprises:

determining an attribute combination for the resource, wherein the attribute combination for the resource comprises one or more attributes associated with processing capabilities of the resource;

analyzing every work item in the work pool to determine whether each work item comprises an attribute combination matching the processing capabilities of the resource as determined by the attribute combination of the resource;

based on the analyzing step, determining a group of qualified work items that have the requisite attribute combination; and analyzing attributes of the resource to determine the selected work item.

10. The method of claim 9, wherein the work pool comprises every work item in a contact center and wherein the work pool comprises an unordered collection of every work item in the contact center.

11. The method of claim 9, wherein the selected work item is an optimal work item at the time of determining and is selected from a group of qualified and eligible work items and wherein the group of qualified work items is determined via the considering step.

12. The method of claim 9, wherein analyzing every work item in the work pool comprises scanning a work item bitmap which correlates a work item to an attribute combination.

13. The method of claim 9, wherein each work item in the group of qualified work items comprises an attribute combination equal to the attribute combination of the resource.

14. A contact center, comprising:
a routing mechanism including a work item assignment engine configured to make work item assignment decisions by analyzing every resource or work item in the contact center as a potential resource or work item for assigning to a work item or resource, respectively, wherein every resource or work item analyzed by the routing mechanism include available and non-available resources or work items, wherein the routing mechanism has access to one or more bitmaps which correlate a resource or work item to a respective attribute combination representing the resource's or work item's processing capabilities, wherein the work assignment engine is configured to determine an attribute combination for the work item or resource and search the one or more bitmaps for a corresponding attribute combination, and wherein qualified and eligible resources or work items are determined because their respective attribute combination equals the attribute combination for the work item or resource.

15. The contact center of claim 14, wherein every resource or work item in the contact center is represented in a resource or work item pool and wherein the resource or work item pool comprises an unordered collection which lists every resource or work item in the contact center.

16. The contact center of claim 15, wherein the contact center comprises a distributed contact center and wherein every resource in the distributed contact center is listed in the resource pool.

17. The contact center of claim 14, wherein the work item is assigned to a selected resource after analyzing a resource bitmap.

* * * * *